(12) United States Patent
Lewis et al.

(10) Patent No.: US 6,846,209 B2
(45) Date of Patent: Jan. 25, 2005

(54) PROPULSION UNIT

(75) Inventors: Clive David Lewis, Rugby (GB); David Christopher Brook, Rugby (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/323,018

(22) Filed: Dec. 19, 2002

(65) Prior Publication Data

US 2003/0139100 A1 Jul. 24, 2003

Related U.S. Application Data

(63) Continuation-in-part of application No. 10/023,464, filed on Dec. 17, 2001, now Pat. No. 6,582,257.

(51) Int. Cl.$^7$ ................................................. B60L 11/02
(52) U.S. Cl. ............................................................ 440/6
(58) Field of Search .............................................. 440/6

(56) References Cited

U.S. PATENT DOCUMENTS

| | | | | | |
|---|---|---|---|---|---|
| 4,004,265 | A | * | 1/1977 | Woodruff et al. | 367/4 |
| 5,394,039 | A | * | 2/1995 | Suchdev et al. | 310/51 |
| 5,403,216 | A | * | 4/1995 | Salmi et al. | 440/6 |
| 6,278,209 | B1 | * | 8/2001 | Rupp et al. | 310/91 |

FOREIGN PATENT DOCUMENTS

| | | | | |
|---|---|---|---|---|
| EP | 1010614 A1 | * | 6/2000 | B63H/5/125 |
| WO | WO 01/28069 A2 | * | 9/2000 | |

* cited by examiner

*Primary Examiner*—Jesus D. Sotelo
(74) *Attorney, Agent, or Firm*—Kirschstein, et al.

(57) ABSTRACT

A propulsion unit arranged to propel a waterborne vessel comprises an electric motor arranged to provide propulsion, and a housing arranged to contain the motor. The motor is mounted within the housing on resilient couplings. Such propulsion units are used to propel ships, and the like, and are suspended from beneath the vessel. The resilient couplings reduce the noise emitted by the housing.

21 Claims, 6 Drawing Sheets

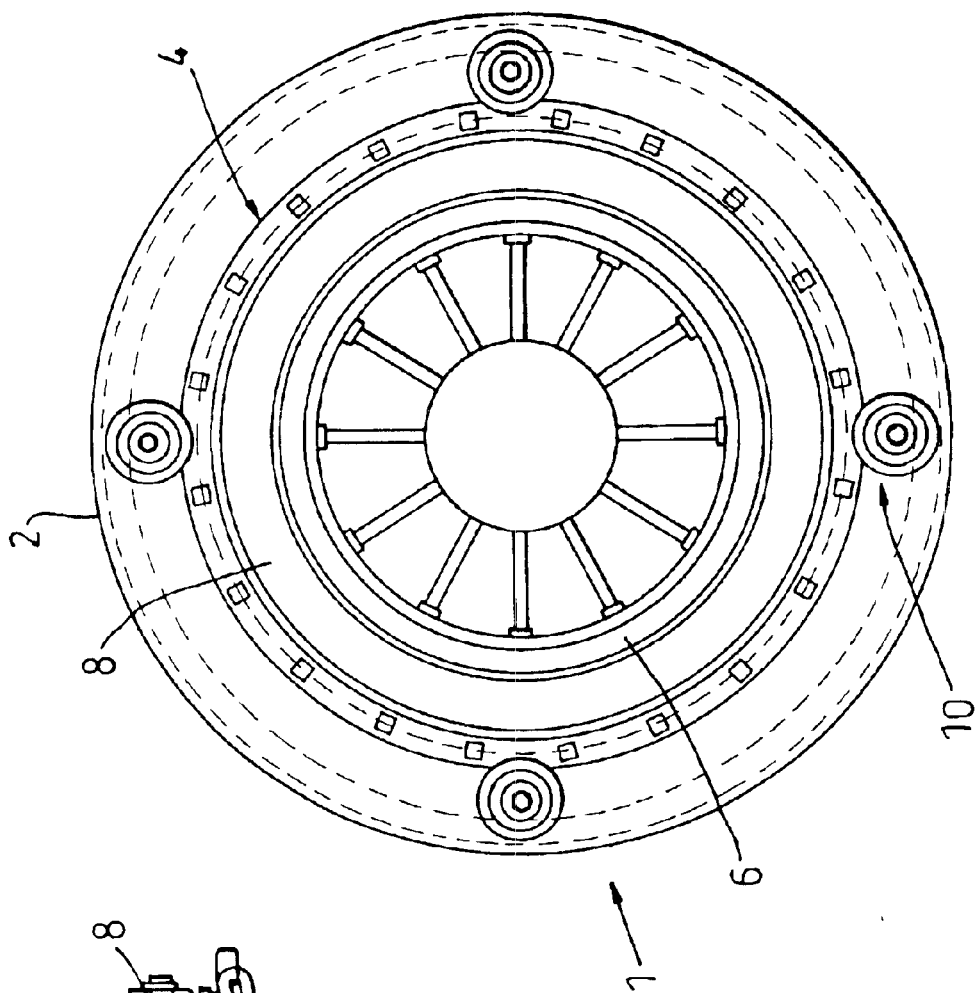
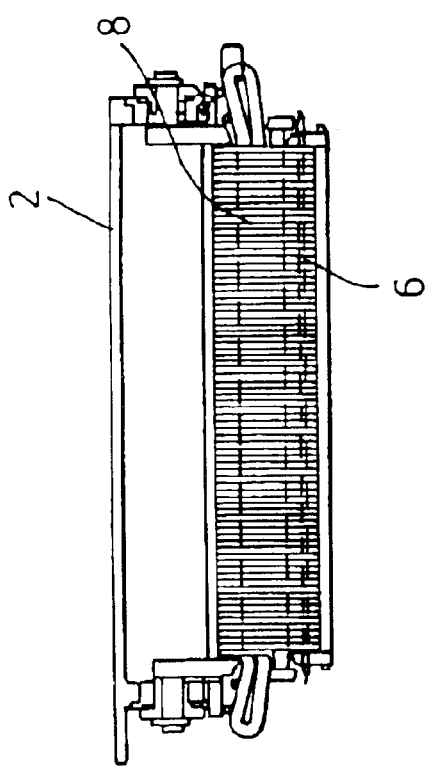
Fig. 1a
Fig. 1b

PROPULSION UNIT

CROSS REFERENCE TO RELATED APPLICATIONS

This application is a continuation-in-part of U.S. patent application Ser. No. 10/023,464, filed Dec. 17, 2001, now U.S. Pat. No. 6,582,257.

FIELD OF THE INVENTION

This invention relates to an improved propulsion unit, and in particular to an improved mounting for an electric motor within such a propulsion unit.

BACKGROUND OF THE INVENTION

It is well known to provide propulsion units that are suspended below the hull of a vessel, typically a ship in order to provide the ship with propulsion, and such propulsion units are commonly referred to as PODs. The concept of a POD for ship propulsion has been known for some time (examples are shown in U.S. Pat. No. 5,403,216, and European Patent No. 1 010 614) and is now in common use. In such an arrangement, the propulsion motor, which is generally electrical, is contained in a pod-like housing suspended below the hull of the vessel. The motor is directly connected to one or more propellers at one end, or both ends, of the pod housing. In cases where there is a propeller at only one end, the propeller can be either in front of or behind the pod casing relative to the water flow.

It will be appreciated that as the ship moves, the POD suspended therebelow will experience drag, which will oppose the motion of the ship. There is therefore a desire to reduce the physical dimensions of the POD so as to minimize the drag experienced by the ship. Therefore, PODs generally have minimal access to the insides thereof, and the propulsion motor is generally mounted on, or in close proximity to the wall of the POD. Therefore, vibrations from the propulsion motor are readily transmitted through the wall of the POD, leading to noise being passed from the POD into the surrounding water.

In many circumstances, it is desirable to minimize the level of noise transmitted to the surrounding water. For instance, cruise ships may want to travel into environmentally sensitive areas, and environmental research vessels or fisheries research vessels, etc., may want to minimize noise at all times. However, it is a problem that known noise isolation systems tend to require an increase in the size of the POD, and that the design of the POD therefore tends to be a compromise between low noise and small size.

SUMMARY OF THE INVENTION

It is an object of the present invention to overcome, or at least reduce, the problems discussed above.

According to a first aspect of the invention there is provided a propulsion unit arranged to propel a waterborne vessel, the unit comprising: an electric motor for providing propulsion, and a housing for containing the motor, the motor being mounted within said housing on a plurality of resilient coupling arrangements for transmitting forces between the motor and the housing, the resilient coupling arrangements being compressible under motor torque forces and effective to attenuate transmission of motor vibrations to the housing at frequencies substantially greater than a predetermined natural frequency of the resilient coupling arrangements.

In the preferred embodiments of the invention, each resilient coupling arrangement comprising first rigid support means attached to the motor, second rigid support means attached to the housing, and resilient cushion means for transmitting forces between the first and second support means, the resilient cushion means being compressible under the motor torque forces and effective to attenuate transmission of motor vibrations to the housing at frequencies substantially greater than a predetermined natural frequency of the resilient cushion means.

An advantage of such an arrangement is that the vibrations from the motor to the housing are significantly reduced and, therefore, the noise emission from the propulsion unit is reduced. Previously, such propulsion units were not fitted with resilient couplings because they entailed making the housing larger (and thus less hydrodynamically efficient), or access to the couplings could not be provided due to the restricted access within the propulsion unit and, therefore, the couplings could not be maintained.

Preferably, the resilient cushion means comprise metallic cushion elements, which are preferably of a woven construction. Such cushion elements are advantageous because they do not require frequent maintenance. In the most preferred embodiment the resilient coupling arrangements have a stiffness that increases as their compression increases, i.e., the stiffness of the metallic cushion elements increases as the compressive deflection of the cushion element increases. Such metallic cushion elements are available from Stop-Choc, of Banbury Avenue, Slough, Berkshire, England.

It will be appreciated that the resilient coupling arrangements will have a natural frequency controlled by the resilience of the resilient cushion means. In the preferred embodiment, the natural frequency of the resilient coupling arrangements is greater than twice the maximum supply frequency of the electric motor. Such an arrangement is convenient because the electric motor will generate vibrations due to the fundamental component of flux within the motor, which occurs at twice the fundamental supply frequency of the motor. It is advantageous to arrange that the natural resonant frequency of the resilient coupling arrangements be greater than twice the maximum supply frequency by an amount sufficient to ensure that the resilient coupling arrangements do not excessively amplify these vibrations, which would occur if the resonant frequency were roughly equal to twice the maximum supply frequency. Nevertheless, vibrations which are generated by the motor at frequencies higher than twice the maximum supply frequency will still be attenuated.

Preferably, the resilient coupling arrangements have a natural frequency selected to suit the motor. Generally, this will be in the range of between roughly 20 Hz, and roughly 50 Hz. Of course, the resilient coupling arrangements may have a natural frequency other than this and may be roughly any one or more of the following (or any value in between): 5 Hz, 10 Hz, 15 Hz, 25 Hz, 30 Hz, 40 Hz, 50 Hz, 75 Hz. It will be appreciated that it is advantageous to have a low natural frequency because the resilient coupling arrangements will not attenuate frequencies below the fundamental frequency, and therefore, the higher the fundamental frequency, the fewer frequencies will be attenuated. However, if the natural frequency of the coupling arrangements is too low, then it does not provide enough stiffness, and deflections of the motor on the coupling arrangements become too large.

In one embodiment, the motor is an induction motor, although other types of electric motor, such as a synchronous motor, are possible.

The propulsion unit may comprise a pulse width modulated drive unit arranged to supply the motor. Such a drive unit is advantageous because the noise components that it introduces onto the current and voltage it supplies to the motor will generally be at a high frequency relative to the resonant frequency of the resilient coupling arrangements and such an arrangement is convenient because it allows these noise components to be readily attenuated by the resilient coupling arrangements. In general, during normal operation, the largest generator of vibrations in the propulsion unit will be non-sinusoidal components in the current supply to the motor.

Preferably, the motor is provided with a limiting mechanism, arranged to limit movement of the motor relative to the housing. Such an arrangement is convenient in conditions in which the routine operating conditions of the motor are exceeded, e.g., fault conditions, or an external impact, etc. In such conditions, the resilient cushion means in the resilient coupling arrangements may not be able to offer sufficient resistance to the movement of the motor, and thus, the limiting mechanism is desirable to prevent excessive movement of the motor.

The limiting mechanism may comprise a gap of predetermined dimensions between confronting abutments associated with the first and second support means, said gap being maintained during normal operation of the motor by the resilient cushion means. Such an arrangement is convenient because it is structurally simple.

In the preferred embodiment the gap is roughly 1.0 to 1.5 mm. However, the gap may be any other suitable dimension, and may be, for example, in the range of approximately 0.5 mm to 2 mm, or roughly any one of following, or any dimension between any of the following: 0.5 mm, 1 mm, 2 mm, 3 mm, 4 mm, 5 mm. It will be appreciated that as the size of the gap increases, the more the motor will be allowed to move before its movement is stopped, and the larger the housing becomes to accommodate the extra gap. On the other hand, if the gap is made too small, the abutments are more likely to contact each other and thus the propulsion unit is likely to emit more noise.

Preferably, a space is defined between the motor and the casing to allow for the passage of cooling fluid around the motor to cool it. Generally, the fluid will be a gas, and in particular, air.

In one embodiment, the resilient coupling arrangements are spaced apart lengthwise along at least one side of the motor and preferably are spaced apart lengthwise along diametrically opposed sides of the motor. The plurality of resilient coupling arrangements is advantageously aligned substantially parallel to a longitudinal axis of the motor. Such an arrangement is convenient because it may be more compact than other possible arrangements.

The housing may have extended portions arranged to house the resilient couplings.

The resilient coupling arrangements may include an intermediate member attached to the second rigid support means. The intermediate member may comprise a bar running substantially parallel to the axis of the motor. An intermediate member may be advantageous because it may allow for easier alignment of the resilient coupling arrangements with the housing.

In an alternative, and perhaps less preferred embodiment, the resilient couplings may be provided at end regions of said motor. Preferably, a plurality of resilient couplings is provided at each end region thereof. Such an arrangement is convenient because it may provide for easier construction of the propulsion unit, but may result in a longer unit.

BRIEF DESCRIPTION OF THE DRAWINGS

There now follows, by way of example only, a detailed description of embodiments of the present invention of which:

FIG. 1a shows a longitudinal section through a first embodiment of a propulsion unit according to the present invention;

FIG. 1b shows an end elevation of the resilient coupling arrangement shown in FIG. 1;

FIG. 2a shows an end elevation of a second embodiment of a propulsion unit according to the present invention;

FIG. 2b shows an end elevation of the resilient coupling arrangement shown in FIG. 2a;

FIG. 3 shows an enlarged detail of a portion of FIG. 1a;

FIG. 4 shows an enlarged detail of a portion of FIG. 2a;

DETAILED DESCRIPTION OF THE PREFERRED EMBODIMENTS

Figures 2A, 2B:
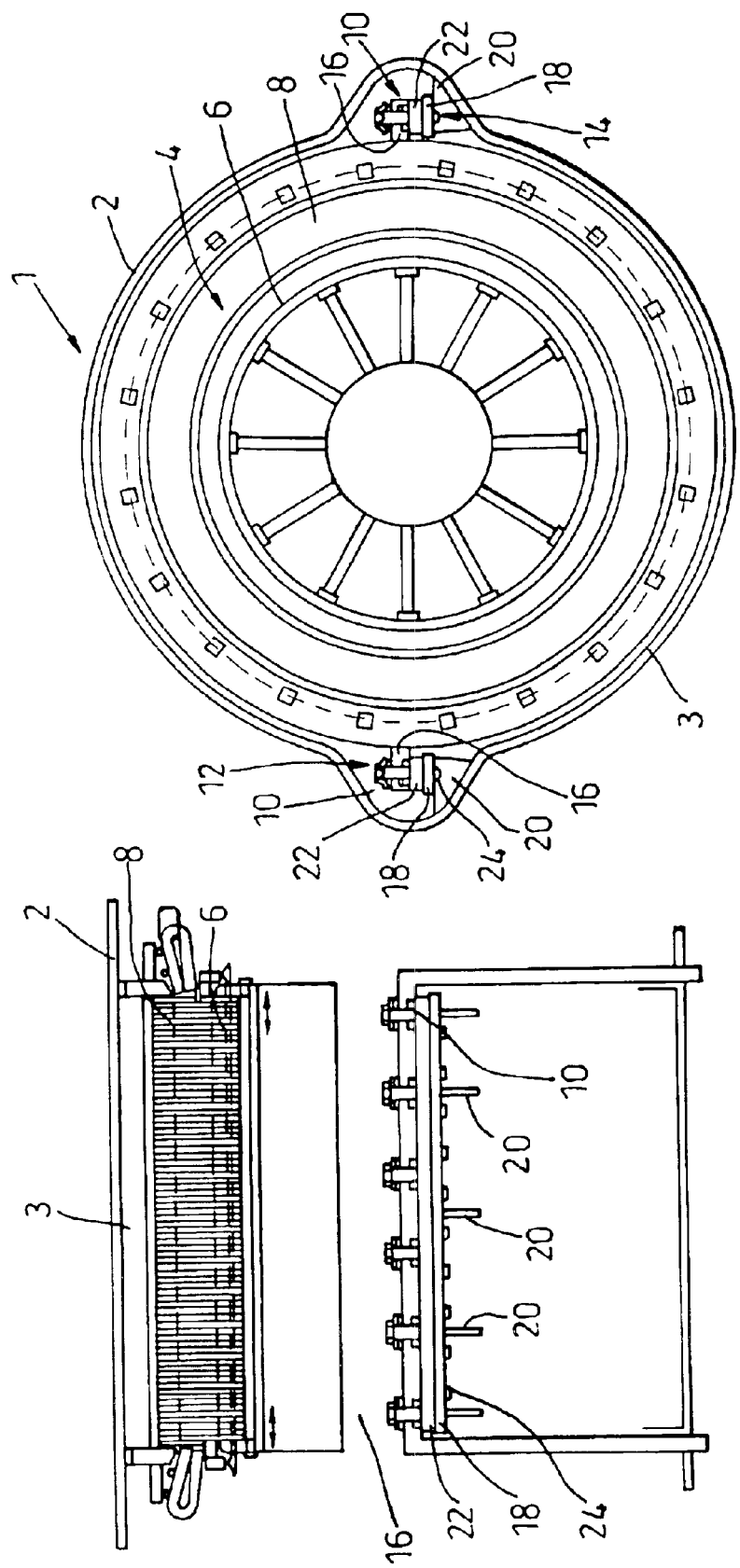

Perhaps the preferred embodiment of this invention is shown in FIG. 2. This shows a section of a propulsion unit 1 (commonly referred to as a POD) having a housing 2 with a motor 4 contained therein. In this embodiment, the motor is an induction motor consisting of a rotor 6, and a stator 8 within the housing 2.

Figure 4:
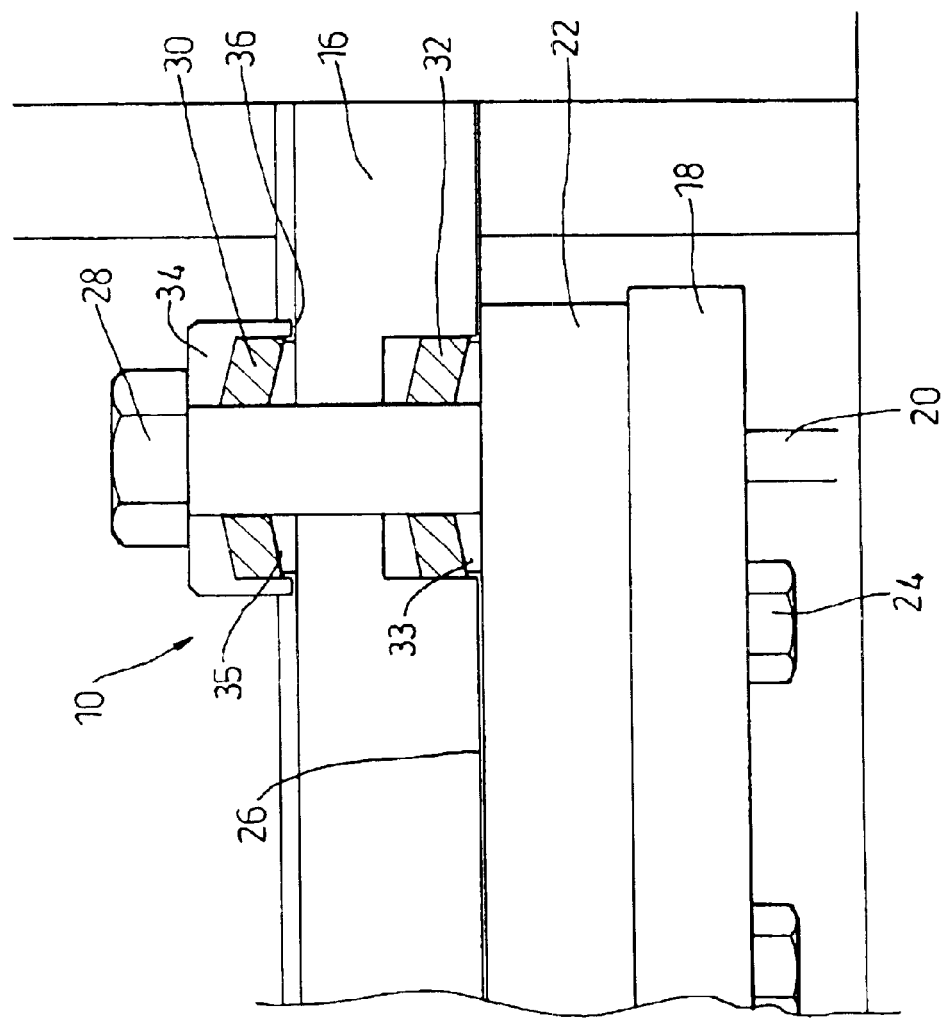

The motor 4 is mounted within the housing 2 on a plurality of resilient couplings 10. A space 3 of substantially annular cross-section is defined between the housing 2 and the stator 8. Space 3 can be filled with cooling fluid that circulates round the motor to cool it. As can be seen from FIG. 2a, six resilient couplings 10 are provided, equispaced, along the length of the motor 4 along a line parallel to a longitudinal axis of the motor 4. Two lines 12,14 of resilient couplings 10 are provided diametrically opposite one another relative to the motor (as is best seen in FIG. 2b). An enlargement of the arrangement of the resilient couplings is seen in FIG. 4.

The motor 4 has a rigid supporting foot 16, providing an abutment portion of the motor, extending therefrom substantially along diametrically opposed sides of the motor. The housing 2 has a rigid supporting abutment portion or seating 18, arranged to co-operate with the motor foot 16. The seating 18 is connected to the housing 2 by a series of webs 20 along its length. An intermediate member 22 between the motor foot 16 and the seating 18 is provided as part of the seating, which facilitates assembly of the motor 4 to the housing 2. The dimensions of the intermediate member 22 can easily be adjusted to obtain exact alignment of the motor and the housing with each other. Bolts 24 securely bolt the intermediate member 22 to the seating 18.

The resilient couplings 10 and the associated rigid supports 16, 18 maintain the circumference of the motor 4 in radially spaced relationship to the housing 2, and will now be described with reference to FIG. 4. It will be appreciated that the motor foot 16 should not directly touch the seating 18/22 in normal operation since this would lead to a direct transmission path for vibrations/noise. Therefore, the resilient couplings 10 are arranged to maintain a relatively small gap 26 between the foot 16 and the seating 18. In this embodiment, the gap 26 is arranged to be roughly 1.5 mm.

A bolt 28 engages the intermediate member 22 and locates the motor 4. However, associated with each bolt there are first and second conical metallic cushion elements 30, 32, which ensure there is no direct contact between the support members 16 and 18/22. A cap element 34 contacts the first cushion element 30 to spread the torque applied by the tensioned bolt 28 evenly across the cushion element 30. However, it should be noted that the cushion element 30 is of such a thickness that there is a small gap 36 between the skirt of the cap element 34 and the foot 16.

The first and second cushion elements 30, 32 are each seated upon an associated mount element 33, 35, the upper surfaces of which are conical to match the undersides of the cushion elements and spread the applied loads evenly across the cushion elements. The undersides of the mount elements are planar and abut the similar planar upper surfaces of motor foot 16 and intermediate member 22.

In normal operation of the motor 4 within the housing 2, the metallic cushion elements 30, 32 resist the torque of the motor and the gap 26 is maintained between the foot 16 and the seating 18/22. Therefore, the vibrations generated by the motor 4 are attenuated as described below in relation to FIG. 6, and are not fully passed to the housing 2.

Under fault conditions (e.g., an electrical fault), or shock loading (e.g., an impact of the vessel on which the propulsion unit is mounted) the torque resistance of the cushion members 30, 32 may be exceeded. If the torque/force limit is exceeded, the motor 4 will move relative to the housing 2 such that the motor foot 16 comes into contact with the seating 18/22. The foot 16 and seating 18/22 can oppose much greater torque/forces and further rotation/translation of the motor 4 relative to the housing 2 is prevented. Once the fault has been cleared, the resilient nature of the cushion members 30, 32 ensures that the motor 4 returns to its original position, restoring the gap 26.

Figure 3:
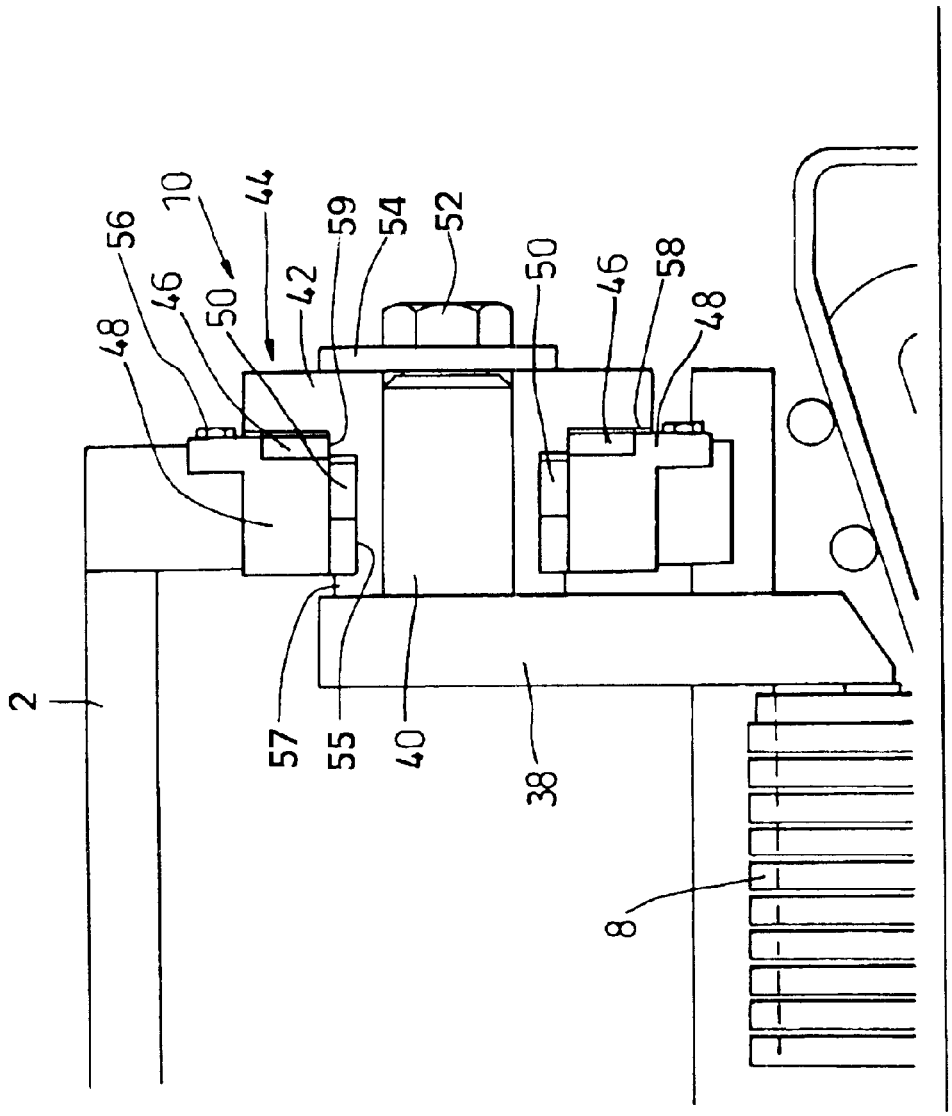

A second embodiment of the invention is described in relation to FIGS. 1a, 1b and 3, and like parts compared to the first embodiment have been given the same reference numerals. In this embodiment the resilient couplings 10 are provided at end regions of the motor 4, and are arranged at four radial positions at each end of the stator 8. However, it should be understood that the number of resilient couplings necessary to support the motor from the casing will depend on the size and torque of the motor. Clearly, the rotor 6 must be free to rotate and is not anchored relative to the housing.

An annular end plate or arm 38 is securely attached to the stator 8 and has a pin 40 protruding therefrom at each resilient coupling location. A sleeve 42 is provided around each pin 40 and has a flange 44 at its outboard end region away from the motor 4. Sleeve 42 is a close fit on the pin 40, which is a close fit in a flat-bottomed hole (not shown) in the end plate 38. To maintain the inboard end face of each sleeve 42 in contact with the end plate 38, a bolt 52 passes through a clamp washer 54 and the pin 40. Bolt 52 screws into a threaded hole (not shown) in the end plate 38.

It should be noted from FIG. 3 that the sleeve 42 at each resilient coupling location, though having a plain cylindrical bore to accommodate the pin 40, has a stepped external surface. Additional to the flange portion 44, this stepped external surface comprises a cylindrical surface 55 extending between an inboard cylindrical shoulder 57 which abuts the plate 38 and an outboard cylindrical shoulder 59 next to flange 44, the surface 55 being of smaller radius than the shoulders 57 and 59. An inboard face of the flange 44 abuts a first circular metallic cushion element 46 which surrounds the shoulder 59, the first cushion element being rectangular in cross-section and seated within a corresponding recess in a bush 48. Bolts 56 fix bush 48 to the housing 2. To provide damping of axial (X direction) components of motor vibration and to axially locate the motor 4 relative to the housing 2 against motor torque forces, while preventing excessive motor movement under shock, the first cushion element 46 has a thickness sufficient to leave a small gap 58 between the confronting faces of the flange 44 and the bush 48 when the bolt 52 is fully screwed home. A second circular cushion element 50, also of rectangular section, surrounds the sleeve 42 and provides damping of radial (Y-direction) components of motor vibration while radially locating the motor 4 relative to the housing 2. It is housed in the recess of the sleeve 42 formed by the reduced radius surface 55 and is sandwiched between surface 55 and the inner surface of the bush 48.

Although the first and second cushion elements in FIG. 3 have been described above as though they were unitary, it is perhaps more likely that they would respectively comprise several first cushion elements and several second cushion elements arranged as sectors of a circle around the sleeve 42. This would probably be necessary because of difficulties in manufacturing unitary circular cushions having a sufficiently large diameter.

Figure 6:
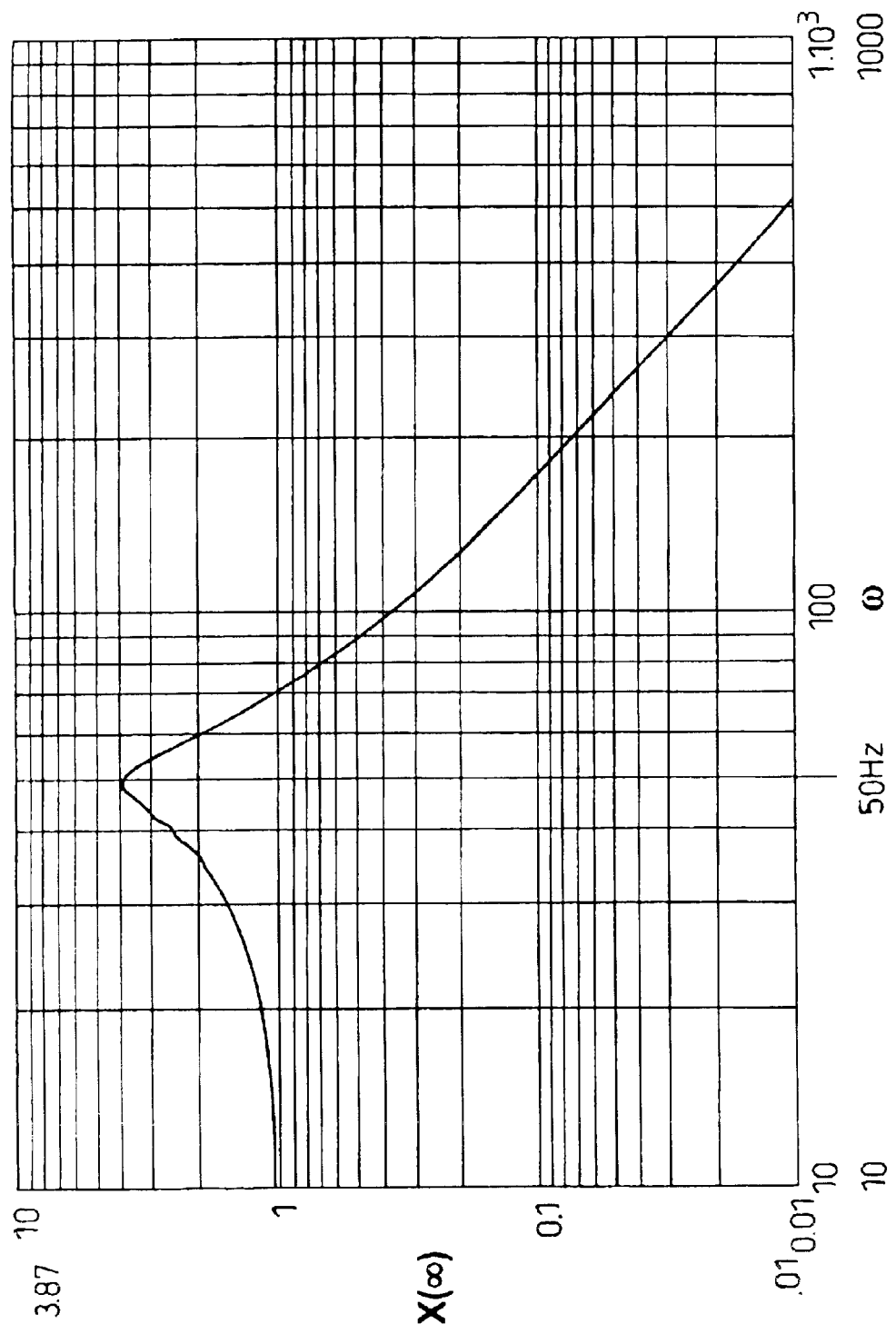
FIG. 6 is a graph comparing the frequency response of a resilient coupling arrangement according to the present invention with frequency responses of known other arrangements.

The cushion elements used in the above description are of a woven metallic nature, and may be obtained from Stop-Choc, of Banbury Avenue, Slough, Berkshire, SL1 4LR, United Kingdom (www.stopchoc.co.uk). The cushion elements are chosen to have a natural frequency to suit the motor and, in this embodiment, the natural frequency is roughly 50 Hz, which is shown in FIG. 6. It can be seen from the figure that for frequencies of less than 50 Hz, the cushion element passes vibration therethrough and there is no attenuation. Indeed, as the frequency approaches 50 Hz, the natural frequency, the cushion element in fact amplifies the vibration. Therefore, the motor 4 and resilient coupling combination are specified so that significant vibrations from the motor do not occur at the coupling natural frequency.

Figure 5:
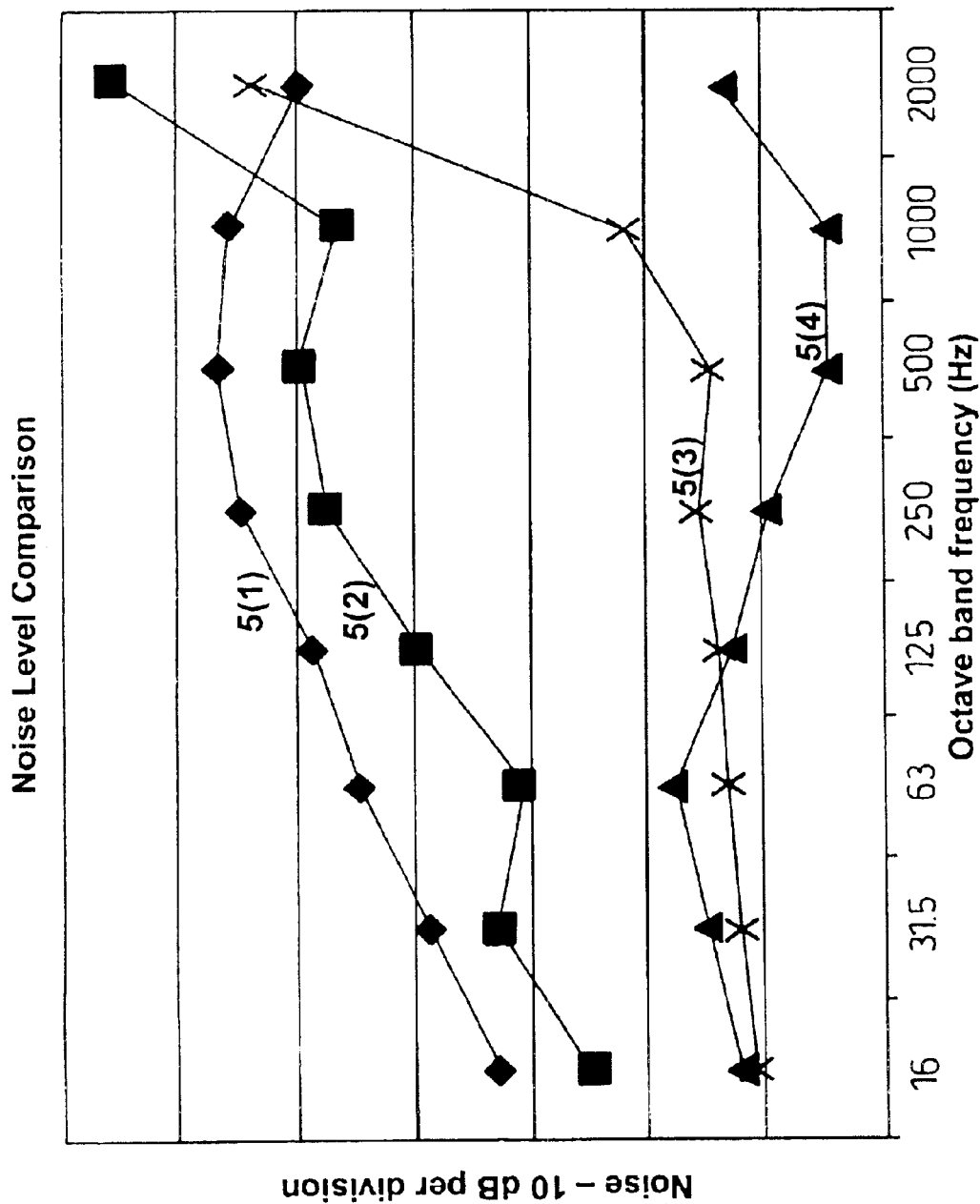
FIG. 5 is a graph showing the improvements achieved by utilizing the present invention.

FIG. 5 shows a comparison of the noise emitted by prior art propulsion units (PODs), and also by propulsion units utilizing the present invention. The horizontal axis shows frequency, and it can be seen that measurements have been taken at eight octave band frequencies. The vertical axis shows the noise in decibels (dB). Four propulsion unit/motor combinations have been measured, the results being plotted as lines 5(1) to 5(4). 5(1) represents a commercially available synchrodrive propulsion unit (or POD) rated at 20 MW; 5(2) represents a 20 MW induction motor run from a PWM supply; 5(3) represents a 28 MW quiet design motor run from a PWM supply; and 5(4) represents the same 28 MW motor fitted into a pod and mounted on resilient couplings in accordance with the present invention. It will be appreciated that the couplings fitted to the arrangement shown in the fourth line have significantly reduced the vibration transmitted to the housing, and thus, will have significantly reduced the noise of the propulsion unit.

Looking at FIG. 5 it will be appreciated that, at high frequencies (as represented by the plot at 2 kHz), the quiet design motor represented by the third line is in fact noisier than the commercially available 20 MW synchrodrive pod represented by the first line. However, the resilient couplings can readily attenuate vibrations that occur significantly above the natural frequency. Therefore, it does not matter as much that the motor used produces more vibration at high frequency because these can be readily attenuated.

It will be understood that each of the elements described above, or two or more together, also may find a useful application in other types of constructions differing from the types described above.

While the invention has been illustrated and described as embodied in a propulsion unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A propulsion unit arranged to propel a waterborne vessel, the unit comprising: an electric motor for providing propulsion, and a housing for containing the motor, the motor being mounted within said housing on a plurality of resilient coupling arrangements for transmitting forces between the motor and the housing, the resilient coupling arrangements being compressible under motor torque forces and effective to attenuate transmission of motor vibrations to the housing at frequencies substantially greater than a predetermined natural frequency of the resilient coupling arrangements.

2. A propulsion unit arranged to propel a waterborne vessel, the unit comprising: an electric motor for providing propulsion, and a housing for containing the motor, the motor being mounted within said housing on a plurality of resilient coupling arrangements, whereby motor torque forces are transmitted to the housing, each resilient coupling arrangement comprising first rigid support means attached to the motor, second rigid support means attached to the housing, and resilient cushion means for transmitting forces between the first and second support means, the resilient cushion means being compressible under the motor torque forces and effective to attenuate transmission of motor vibrations to the housing at frequencies substantially greater than a predetermined natural frequency of the resilient cushion means.

3. The propulsion unit according to claim 2, wherein the resilient cushion means comprise metallic cushion elements.

4. The propulsion unit according to claim 3, wherein the metallic cushion elements are of woven construction.

5. The propulsion unit according to claim 2, wherein the resilient coupling arrangements include a limiting mechanism for limiting movement of the motor relative to the housing.

6. The propulsion unit according to claim 5, wherein the limiting mechanism comprises a gap of predetermined dimensions between confronting abutments associated with the first and second support means, said gap being maintained during normal operation of the motor by the resilient cushion means.

7. The propulsion unit according to claim 6, wherein the gap is in a range of approximately 0.5 mm to 2 mm.

8. The propulsion unit according to claim 7, wherein the gap is in the range of approximately 1.0 to 1.5 mm.

9. The propulsion unit according to claim 1, wherein a natural frequency of the resilient coupling arrangements is greater than twice a maximum supply frequency of the electric motor.

10. The propulsion unit according to claim 1, wherein the resilient coupling arrangements have a natural frequency in a range of approximately 20 Hz to 50 Hz.

11. The propulsion unit according to claim 1, wherein the motor is an induction motor.

12. The propulsion unit according to claim 1, wherein the motor is a synchronous motor.

13. The propulsion unit according to claim 1, and further comprising a pulse width modulated (PWM) drive unit for supplying the motor.

14. The propulsion unit according to claim 1, wherein a space is defined between the motor and the housing to accommodate passage of a cooling fluid around the motor.

15. The propulsion unit according to claim 14, wherein the resilient coupling arrangements are aligned substantially parallel to a longitudinal axis of the motor.

16. The propulsion unit according to claim 14, wherein the resilient coupling arrangements are provided at an end region of said motor.

17. The propulsion unit according to claim 16, wherein the resilient coupling arrangements are provided at both end regions of said motor.

18. The propulsion unit according to claim 1, wherein the resilient coupling arrangements are spaced apart lengthwise along at least one side of the motor.

19. The propulsion unit according to claim 1, wherein the resilient coupling arrangements are spaced apart lengthwise along diametrically opposed sides of the motor.

20. The propulsion unit according to claim 1, wherein the housing has radially extended portions for housing the resilient coupling arrangements.

21. The propulsion unit according to claim 1, wherein the resilient coupling arrangements have a stiffness which increases as their compression increases.

* * * * *